United States Patent [19]

Ulinski

[11] Patent Number: 5,325,156
[45] Date of Patent: Jun. 28, 1994

[54] SERVICE CALL INITIATION AND FEEDBACK INTERFACE FOR A REPROGRAPHIC MACHINE

[75] Inventor: John S. Ulinski, Pittsford, N.Y.

[73] Assignee: Xerox Corporation, Stamford, Conn.

[21] Appl. No.: 979,033

[22] Filed: Nov. 20, 1992

[51] Int. Cl.$^5$ .................... G03G 15/00; G03G 21/00
[52] U.S. Cl. .................................. 355/209; 355/204; 371/16.4
[58] Field of Search ............... 355/200, 202, 204, 206, 355/209; 371/16.4

[56] References Cited

U.S. PATENT DOCUMENTS

| | | | |
|---|---|---|---|
| 4,390,953 | 6/1983 | Jonstone | 379/176 X |
| 4,703,325 | 10/1987 | Chamberlin et al. | 370/106 X |
| 4,718,079 | 1/1988 | Rabito | 379/106 X |
| 4,823,290 | 4/1989 | Fasack et al. | 379/106 X |
| 4,847,894 | 7/1989 | Chanvin et al. | 379/106 X |
| 4,996,703 | 2/1991 | Gray | 379/106 X |
| 5,010,568 | 4/1991 | Merriam et al. | 379/106 X |
| 5,214,772 | 5/1993 | Weinberger et al. | 355/204 X |
| 5,216,461 | 6/1993 | Maekawa et al. | 355/202 |
| 5,220,380 | 6/1993 | Hirata et al. | 355/204 |
| 5,241,402 | 8/1993 | Aboujaoude et al. | 355/202 X |

Primary Examiner—Fred L. Braun
Attorney, Agent, or Firm—Oliff & Berridge

[57] ABSTRACT

A service call system for reprographic machines includes an operator-initiated calling routine that automatically communicates the machine with a remote diagnostic or service facility. Predetermined data relating to the identity of the machine and the nature of the fault are communicated at the time of the initial call. The system provides for interactive communication to obtain additional information or display status messages at the reprographic machine.

6 Claims, 5 Drawing Sheets

SERVICE CALL INITIATION AND FEEDBACK INTERFACE FOR A REPROGRAPHIC MACHINE

BACKGROUND OF THE INVENTION

1. Field of the Invention

This invention relates to reprographic machines. It has particular applicability to service call systems for reprographic machines.

2. Description of Related Developments

Recently, systems for monitoring the operation of a plurality of reprographic machines from a remote source by use of a powerful host computer having advanced, high level diagnostic capabilities have been installed. These systems have the capability to interact remotely with the machines being monitored to receive automatically initiated or user initiated requests for diagnosis and to interact with the requesting machine to receive stored data to enable higher level diagnostic analysis. Such systems are shown in U.S. Pat. Nos. 5,038,319 and 5,057,866 (the disclosures of which are incorporated herein by reference), owned by the assignee of the present invention. These systems employ Remote Interactive Communications (RIC) to enable transfer of selected machine operating data (referred to as machine physical data) to the remote site at which the host computer is located, through a suitable communication channel. The machine physical data may be transmitted from a monitored document system to the remote site automatically at predetermined times and/or in response to a specific request from the host computer.

In a typical RIC system, the host computer is linked via a public switched telephone system or a combination of public and dedicated systems to local reprographic machines via modems. The host computer may include a compiler to allow communication with a plurality of different types of machines and an expert diagnostic system that performs higher level analysis of the machine physical data than is available from the diagnostic system in the machine. After analysis, the expert system can provide an instruction message which can be utilized by the machine operator at the site of the document system to overcome a fault. Alternatively, if the expert system determines that more serious repair is necessary or a preventive repair is desirable, a message is sent to a local field work office giving the identity of the machine and a general indication of the type of service action required.

A call for service is initiated by an operator at the machine location and is transmitted orally by telephone from the local machine operator to an operator at the host computer or at a local field work support system. This system is disadvantageous from the standpoint that the communication between the local machine operator and the remote operator is oral, the local operator commonly has only limited information about the technical aspects of the machine requiring repair and the local operator normally has little time to spend in communicating the information. The result is that the remote operator receives only limited or erroneous information relating to the identity of the machine requiring service and only a brief description of the problem requiring a repair action. If the faulted machine is erroneously identified in the oral communication between the local and remote operators, the remedial information necessary to effect a repair may be misdirected or may be inappropriate to the faulted machine, thereby causing delay in returning the machine to service and adding expense to the repair procedure. Further, in many instances, the local operator has no indication of the status of the repair request or an indication of when repair procedures will be made.

SUMMARY OF THE INVENTION

This invention provides for improved communication between a faulted machine and a central diagnostic system or local field service facility. A user interface at the faulted machine is used to establish communication with a remote diagnostic or service facility, automatically transmit machine identity and physical data, with or without additional operator-supplied information, and to accept and display status messages, without the need for oral communication.

DESCRIPTION OF PREFERRED EMBODIMENTS

Figure 1:
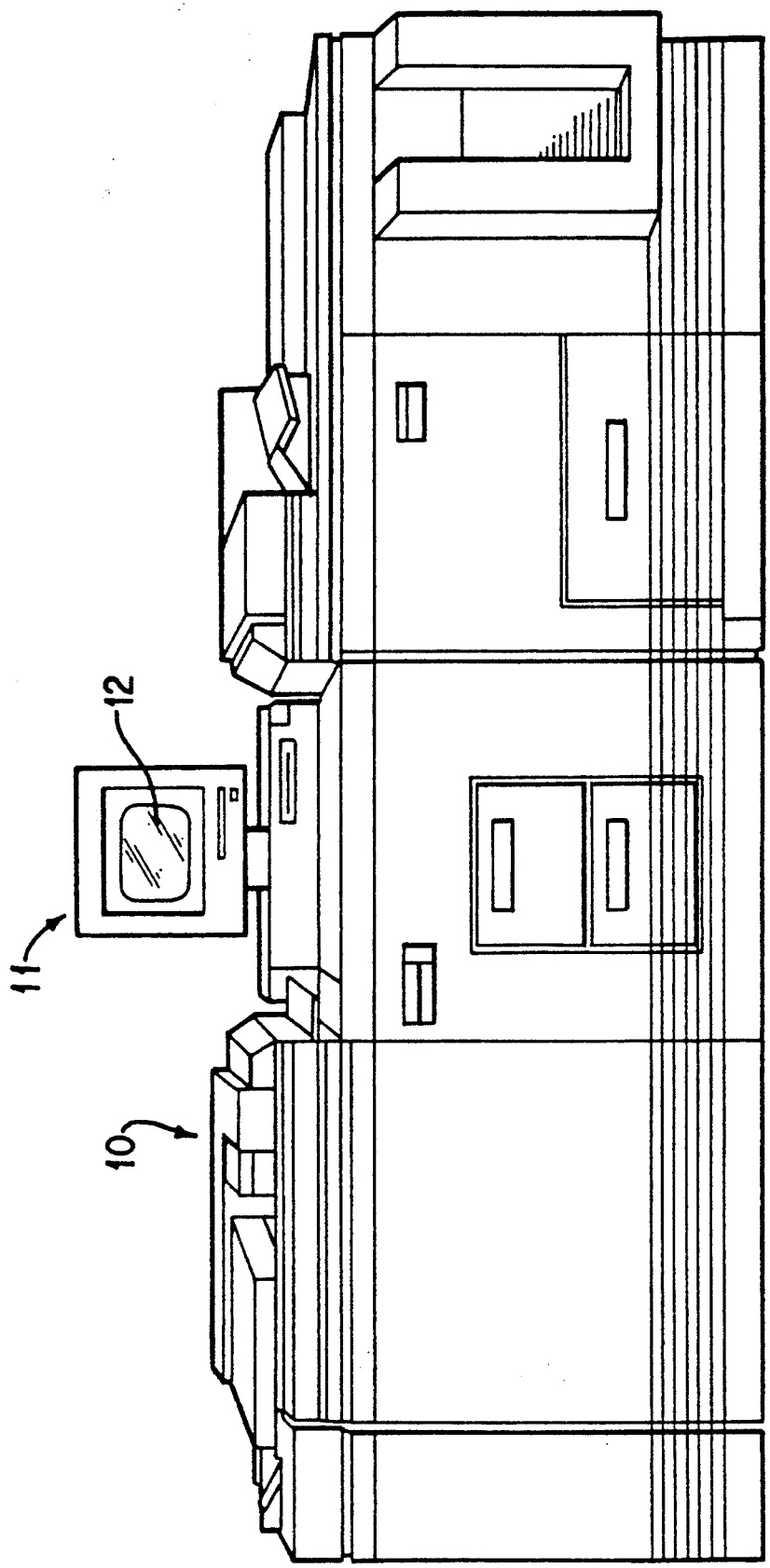
FIG. 1 shows a typical reprographic machine having a user interface suitable for use with the present invention.

Referring to FIG. 1, there is shown an electrophotographic reproduction machine 10 composed of a plurality of programmable components and subsystems which cooperate to carry out copying or printing jobs programmed through a touch dialog screen 12 of a user interface (UI) 11. Internal operating systems of the machine 10 are disclosed in U.S. Pat. Nos. 5,038,319 and 5,057,886 and no further detailed description thereof is necessary.

Figure 2:
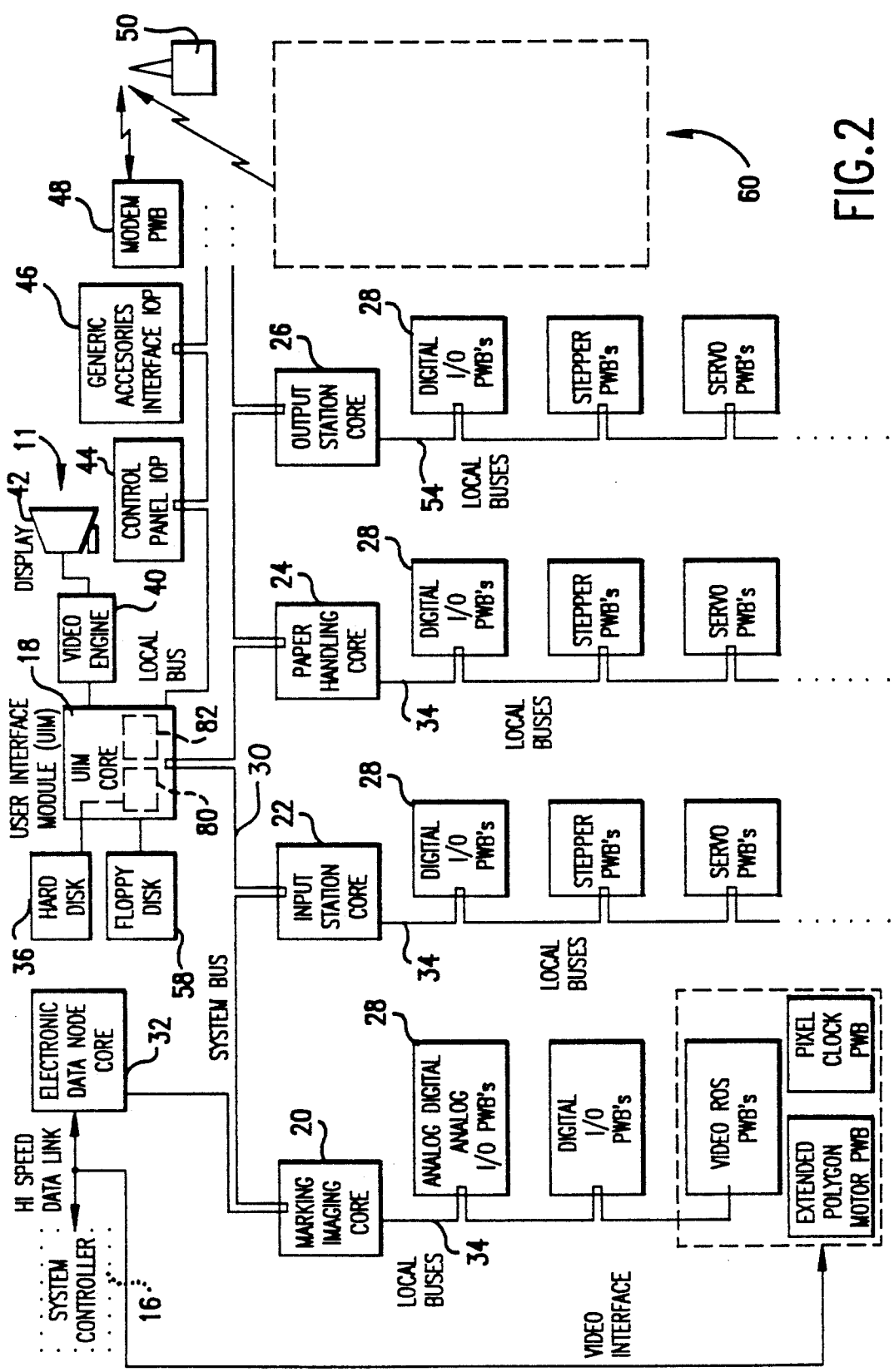
FIG. 2 is a schematic diagram of reprographic equipment having a user interface for communicating with a remote diagnostic or service facility.

Referring to FIG. 2, operation of the various components of machine 10 is regulated by a control system which uses operating software stored in memory in the system controller 16 to operate the various machine components in an integrated fashion to produce copies and prints. The control system includes a plurality of printed wiring boards (PWBs), there being a user interface module core PWB 18, a marking imaging core PWB 20, an input station core PWB 22, a paper handling core PWB 24 and an output station core PWB 26, together with various input/output (I/O) PWBs 28. A shared line (SL) 30 couples the core PWBs 18, 20, 22, 24 and 26 with each other and with the electronic data node core 32, while local buses 34 serve to couple the I/O PWBs to the respective cores and to stepper and servo PWBS. Programming and operating control over machine 10 is accomplished through touch dialogue screen 12 of UI 11. The operating software includes application software for implementing and coordinating operation of the machine components.

Floppy disk port 38 provides program loading access to UIM core PWB 18 for the purpose of entering changes to the operating software, loading specific programs, such as diagnostic programs, and retrieving stored data, such as machine history data and fault data, etc. using floppy disks. Hard disk 36 is utilized as a non-volatile memory (NVM) to store programs, machine physical data, and specific machine identity information.

A two-way flow of information from the UI system manager of core 18 is provided through the generic accessories interface input/output processor 46, which includes remote access control software and accessories control software. Information from and to the generic accessories interface processor 46 is controlled by modem control software in the modem 48. That information is transferred via a public switched telephone network, dedicated transmission network, or other data transmission network to and from a remote service site 60.

UIM core PWB 18 communicates with video engine 40 for driving a suitable visual display 42, such as a CRT or flat screen of the user interface 11. The UIM core 18 also has connected thereto a control panel I/O processor 44 and a generic accessories interface I/O processor 46. The interface I/O processor 46 is in turn connected to a modem PWB 48. The modem 48 provides communication between machine 10 and a communications channel, such as a public switched telephone network 50.

Information in the form of signals to or from the electromechanical devices on the servo PWBs and stepper PWBs is transferred to and from the digital I/O PWBs 28. Information from and control information to the PWBs 28 is centralized through the subsystem cores, such as cores 20, 22, 24 and 26.

The information from the subsystem cores flows to and from the UIM core 18, which embodies software control systems including a user interface system manager and a user interface diagnostic manager. The UI system manager includes a UI display manager subsystem for controlling the display of messages on the display 42. A data manager subsystem provides data management to the UI system manager. The UIM core 18 includes an alert criteria file 80, preferably implemented in software, and a communication switch 82, also implemented in software.

Figure 4:
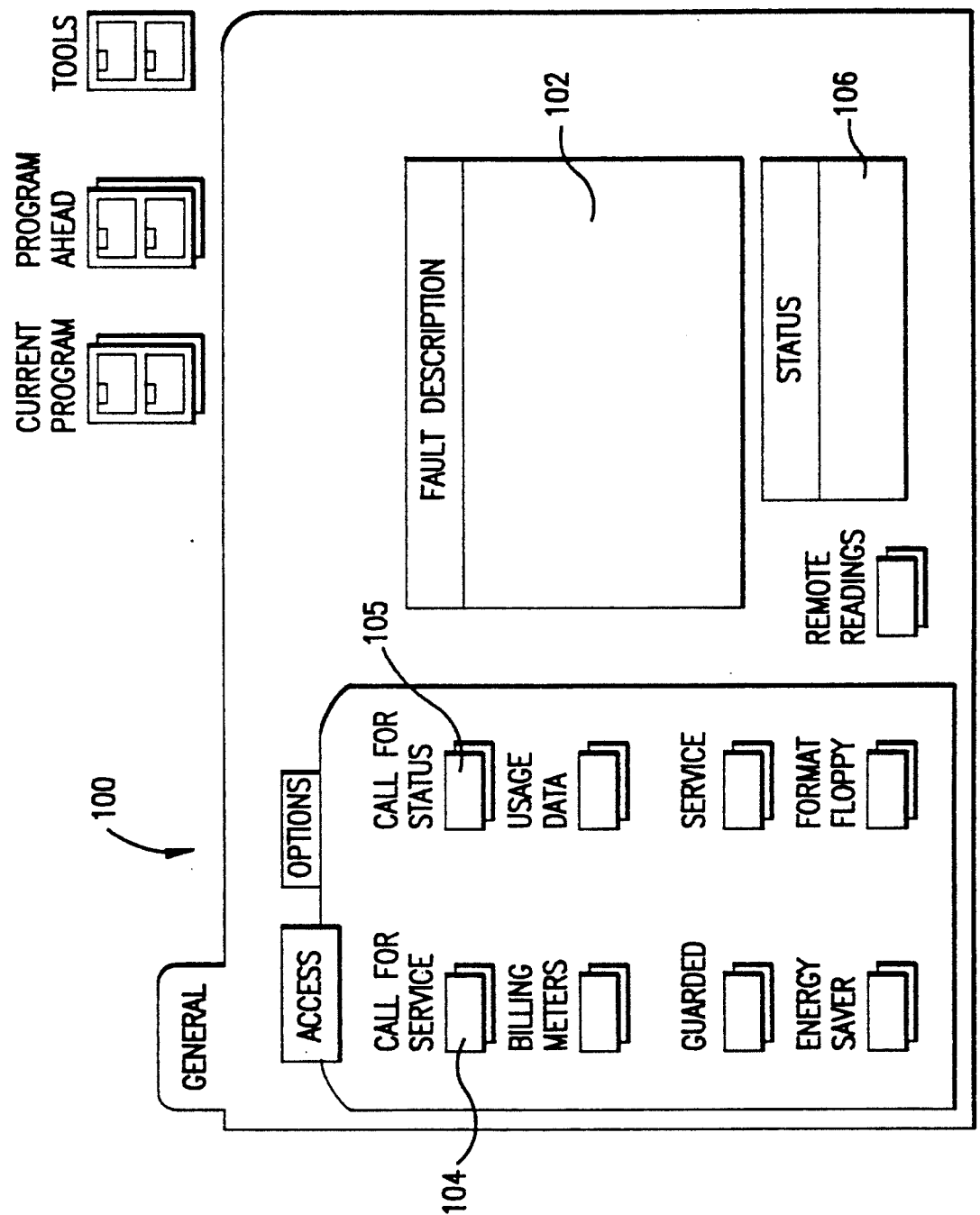
FIG. 4 illustrates a typical pull down menu for enabling a call for service.

The alert criteria file stores in non-volatile memory, such as hard disk 36, a plurality of alert criteria that are or can be indicative of a machine malfunction. The alert criteria file 80 receives inputs of machine physical data from sensors in the various subsystems of machine 10. This data is handled through the respective system cores 20, 22, 24 and 26 and is supplied to the alert criteria file 80 through the system bus 30. When the alert criteria file identifies an alert condition, the file 80 provides a command to the UIM core management software to display the appropriate system alert on the interface 11, thereby providing a visual message or alarm to the operator. Various alert criteria can be stored on hard disk 36 and no further description of such criteria is necessary, as such criteria are generally known. When an alert message is displayed on UI 11, the operator has an option to request further diagnosis or service through the touchscreen 12 of the user interface 11. For this purpose, an appropriate pull down menu, such as shown in FIG. 4, may be used for activating software communications switch 82 and for providing input of any additional information that the operator finds appropriate to send with a call for service. When the switch 82 is actuated through the touchscreen 12, machine identity data is directed through switch 82 to the generic accessories interface input/output processor 46 for communication via the modem 48 to the remote diagnostic or repair site 60. The message that is sent through switch 82 comprises information necessary to identify the machine by model, serial number and location.

To enable the call for service feature of the invention, the capability is activated by setting a flag in memory that is in a generic protocol in the UIM core, which protocol provides access to NVM 36 through the touchscreen 12 via the pull down menu 100 shown in FIG. 4. Display management systems for pull-down menus are known and no further detailed explanation of them is necessary here. It will be understood that during initialization, other information to enable RIC, such as modem parameters, machine model identity, machine serial number, and host computer telephone number have been entered in NVM 36. This information is handled as an initial data string that is provided to host computer 86 when initiating a service call.

As shown in FIG. 4, the pull down menu also can include a fault description capability enabling the operator to enter common faults by code number or by written description in the fault description screen 102. Such fault description information also can be included in the initial data string sent to host computer 84. To initiate a call for service, the operator may engage the touchscreen 12 by hand at the location of the call for service icon 104 or select the icon with a mouse.

Figure 5:
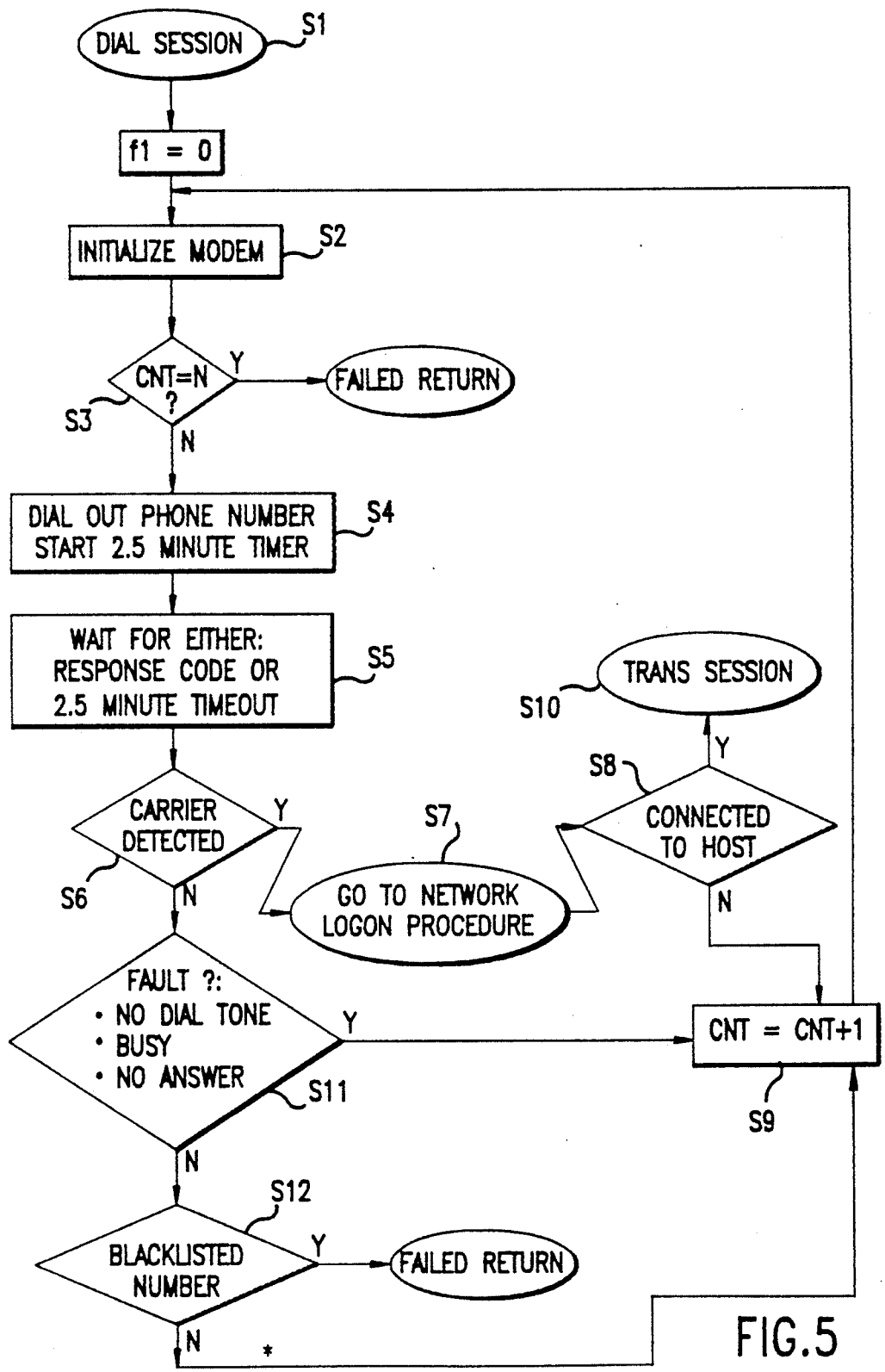
FIG. 5 is a flow chart of communication routine.

When the call for service icon is activated, the machine 10 attempts to place a call to the host computer 84 via the dial/redial routine shown in the flow chart of FIG. 5. Activation of the icon 104 starts a dial session at step S1. The machine 10 may include a hierarchy of dial routines for events of various urgency levels. Usually, a call for service will be assigned to a high priority call routine which initiates an immediate call to the host computer 84.

At step S2, the modem 48 is initialized and the dialing routine begins. Processing close to step S3 to determine if the count of calls attempted during the session equals a predetermined number N. N sets the number of redials attempted by the routine. At step S4 the host telephone number is dialed and at step S5 the system detects the presence either of a response code or the elapse of a predetermined time.

At S6 a determination is made if a carrier line is detected. If a carrier line is detected, the processing goes to a logon procedure of a known type for logging on to host computer 84 in step S7. During the logon procedure the initial data string is transmitted from the NVM to the host computer and the call is identified by at least one bit of the data stream as a call for service. In step S8 a determination is made if a successful connection to the host computer is made and if an affirmative determination is made, the processing goes to step 510 which comprises a data transfer session. In the data transfer session, the information from the alert criteria file and any machine physical data initiating the alert is transmitted to host computer 84. If at S8, a negative determination is made, processing flows to step S9, in which a counter is incremented by one and processing returns to S2.

If a negative determination is made in step S6, in step S11, an inquiry is made if the reason for the lack of a carrier is a communication system event, if so, processing flows to step S9 and a retry is made. If the determination made in step S11 is negative, processing flows to step S12 wherein a determination is made if the attempted telephone number is invalid. If the determination in step S12 is affirmative, the dial session ends and if the determination in step S12 is negative, processing flows to step S9 and a redial is initiated. If the count at step S3 equals the predetermined count, the dial session ends and may be retried under the control of a suitable restarting routine.

Figure 3:
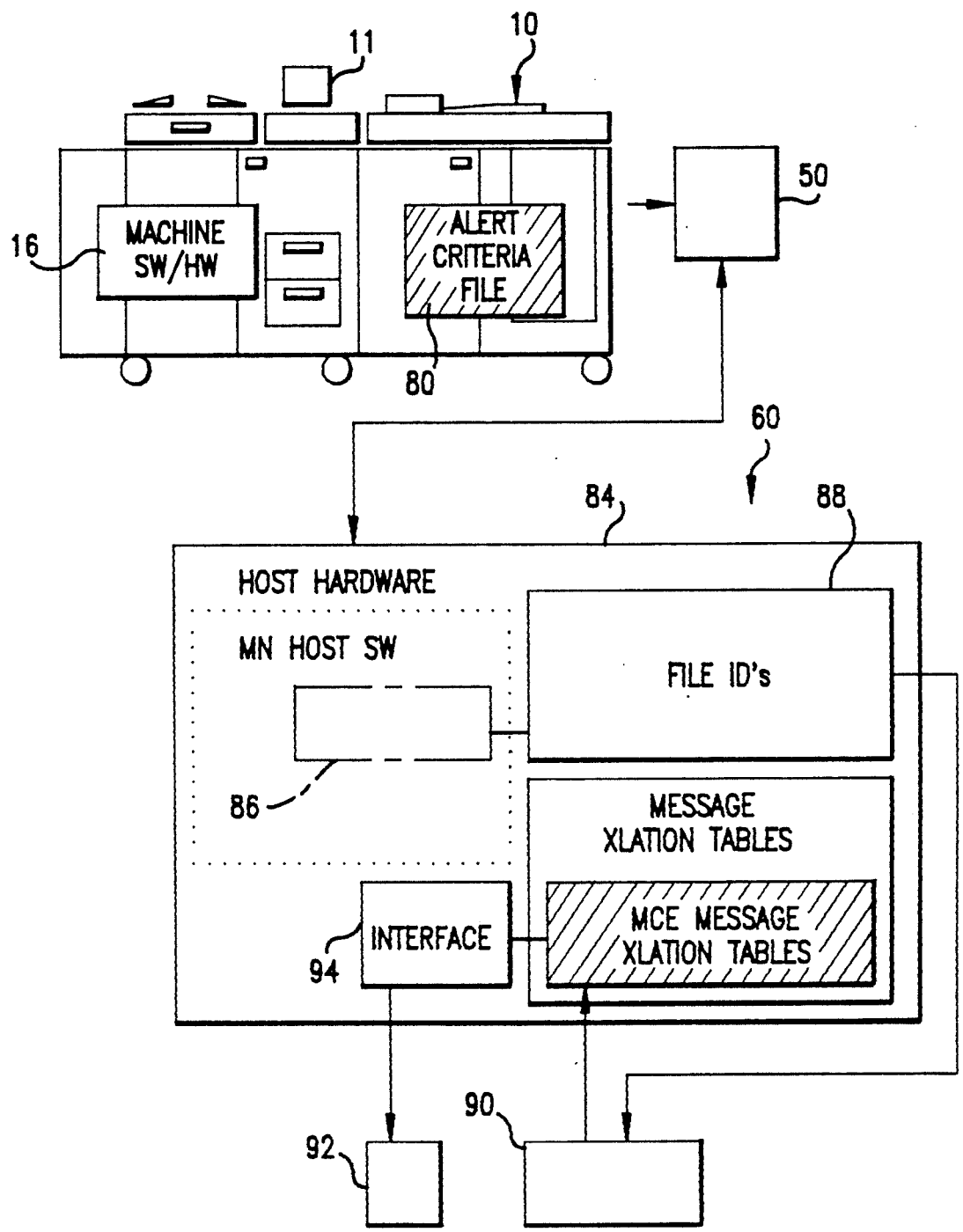
FIG. 3 is a schematic illustration of the remote diagnostic or service site depicted as element 60 in FIG. 2.

Referring to FIG. 3, at a remote diagnostic site 60 there is typically a host computer 84 having appropriate stored software for overall control of the computer 84. In order to enable the computer 84 to communicate with a plurality of different machine types, a compiler 86 is utilized to convert all incoming data into a common machine format. The information from the compiler 86 is provided to an addressable file 88 in which the identities of all machines served by the computer 84 may be stored. The file 88 may also store historical machine physical data and repair histories for each reprographic machine that is serviced by the system. In the event the communication to computer 84 is a request for service, the information from the file 88 for the machine requesting service is provided to diagnostic subsystem 90. The portion of the file for the reprographic machine requesting service is identified by the initial data stream received by host computer 84 during the logon procedure. The diagnostic subsystem 90 includes diagnostic routines that are of a higher level than those normally a part of any diagnostic system within the machine 10. On the basis of the information provided from the file 88, the subsystem 90 determines appropriate corrective measures and supplies direction to a message translation table for providing diagnostic information that can be communicated back to the machine 10 for display, for example on user interface 11, thereby enabling the operator to apply the appropriate corrective action to restart the machine. If the diagnostic subsystem 90 determines that additional machine physical data is necessary to diagnose the machine 10, a return flow of commands issues from host computer 84 through automatic call capabilities (not shown) to reprographic machine 10. The commands may place a request for additional information on the user interface 11 or obtain the required information directly from an NVM, such as hard disk 36, within the machine 10.

The host computer 84 also provides status information, through the communication link 50 back to the user interface 11 to advise the operator of the status of the service request. This information can be provided on the basis of schedule information and subroutines available in the control software of the computer 84 or can be manually provided through an input terminal 92, such as a keyboard and display unit, through an interface port 94. If the results of the diagnostic routines performed in the diagnostic subsystem 90 indicate that a repair call by a service representative is necessary to restart the reprographic machine 10, an operator at the service site 60 can provide this information, entered through input unit 92, for display at the user interface 11. Such information can include the name of the service representative assigned and the estimated time of arrival. The status information may be stored in the file 88 and either provided automatically to machine 10 or upon request from machine 10. The data stream sent by host computer 84 to machine 10 can include an appropriate identifier bit for identifying the data stream as status information. The status information is directed by the processor in UIM core 18 to video engine 40, to display status information in the status field 106 of the pull down menu shown in FIG. 4.

The communications switch 82 also includes a call for status request, which is preferably implemented through menu 100 displayed on UI 11. The call is initiated by the operator on menu 100 by actuation of the call for status icon 105, through touchscreen 12 or by use of a mouse. Basically the same procedure described above with respect to the call for service is followed with respect to the call for status. The initial stream includes a unique identifier for indicating that the call is for status. The status call is identified as such and communicated to host computer 84, including the necessary information from hard disk 36 for identifying the requesting machine. As described above, information regarding repair status for each machine 10 is stored in computer 84, preferably in file 88. The status information is entered and updated in file 88 through input terminal 92 by the host computer operator. When a call for status is received, the host computer 84 directs the status information back to machine 10, through communications system 50, for display on the UI 11. When service has been completed, an appropriate message can be supplied to the file 88, either from UI of reprographic machine 10 or from terminal 92 to remove the service call status information from file 88.

The foregoing system provides for the quick and accurate initiation of a service call automatically, without the need for oral communication. Thus, any errors that could result from such oral communication are substantially eliminated. Further, status information is available and automatically provided at the faulted machine without the need for oral communication with personnel at the machine site. This provides improved customer satisfaction and can contribute to lower service costs.

What is claimed is:

1. A service request system for a reprographic machine comprising:
   first storing means for storing identity information relating to identification of the reprographic machine;
   second storing means for storing machine status information relating to the reprographic machine;
   a user interface means at the reprographic machine for establishing communication with a remote facility via a communication line;
   a user-activated means for initiating a communication to the remote facility via the user interface;
   transmission means responsive to actuation of the user-activated means for causing automatic transmission along the communication line of the identity information, at least some of the machine status information and a request for service to the remote facility; and
   diagnostic means at the remote facility actuated in response to the transmission means for making a diagnosis of the reprographic machine in the remote facility and relaying at least one of the diagnosis and information relating to the request for service along the communication line back to the user interface.

2. A system as in claim 1, wherein the machine status information comprises machine physical data.

3. A system as in claim 2, wherein the second storing means comprises a non-volatile memory located in the reprographic machine.

4. A system as in claim 1, further comprising:
   an input means for providing information to be transmitted to the remote service facility; and means for transmitting information provided by the input means to the remote facility when the user-activated means is activated.

5. A system as in claim 1, further comprising:

a message sending device at the remote facility;

a display at the location of the reprographic machine; and means for causing a message from the remote facility to be displayed on the display.

6. A system as in claim 5, wherein the user-activated means and the display means comprise a touchscreen user interface.

* * * * *